US009612899B2

United States Patent
Della Corte et al.

(10) Patent No.: US 9,612,899 B2
(45) Date of Patent: *Apr. 4, 2017

(54) COLLABORATIVE COLLECTION OF DIAGNOSTICS DATA OF SOFTWARE PROGRAMS

(71) Applicant: International Business Machines Corporation, Armonk, NY (US)

(72) Inventors: Gianluca Della Corte, Rome (IT); Giancarlo Delle Cese, Frosinone (IT); Antonio M. Sgro, Fiumicino (IT); Pia Toro, Rome (IT); Ignazio F. Trovato, Via Nora Ricci (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/918,775

(22) Filed: Oct. 21, 2015

(65) Prior Publication Data

US 2016/0259677 A1 Sep. 8, 2016

Related U.S. Application Data

(63) Continuation of application No. 14/638,040, filed on Mar. 4, 2015.

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01); *G06F 11/0787* (2013.01)

(58) Field of Classification Search
CPC ............. G06F 11/0703; G06F 11/0709; G06F 11/3006; G06F 11/302; G06F 11/3466; G06F 11/3612; G06F 11/366
See application file for complete search history.

(56) References Cited

U.S. PATENT DOCUMENTS 7,734,717 B2   6/2010   Saarimaki et al.
8,271,615 B2   9/2012   Ellison et al.
(Continued)

OTHER PUBLICATIONS

Leordeanu et al., "Scalable Failure Management for Peer-to-peer Networks," Complex, Intelligent and Software Intensive Systems (CISIS), 2012 Sixth International Conference on, pp. 767-774, Jul. 4-6, 2012, doi: 10.1109/CISIS.2012.193.
(Continued)

*Primary Examiner* — Michael Maskulinski
(74) *Attorney, Agent, or Firm* — Robert J. Shatto

(57) ABSTRACT

A computing environment includes multiple software programs running on multiple endpoint computing machines. Each software program has associated diagnostics data. Each endpoint machine is running a diagnostics agent. The diagnostics agents are in communication with each other. A monitoring server interacting with the multiple software programs detects a malfunctioning associated with a software program running on a target endpoint, and submits a request to collect the diagnostics data of the malfunctioning software program. This collecting request is submitted to a service software program different from the malfunctioning program. The service software program may be running on a service endpoint different from the target endpoint. The requested diagnostics data is retrieved by the service software program from a diagnostics agent running on the target endpoint. The monitoring server then receives the requested diagnostics data from the service software program.

13 Claims, 6 Drawing Sheets

(56) References Cited

U.S. PATENT DOCUMENTS

| 8,719,804 B2 | 5/2014 | Jain |
| 2009/0172082 A1 | 7/2009 | Sufuentes |
| 2012/0011200 A1 | 1/2012 | Zhang et al. |
| 2014/0109188 A1 | 4/2014 | Pavlov et al. |

OTHER PUBLICATIONS

Zhong, et al., "Soft-Union: An Overlay Based Efficient Software P2P Distribution Scheme," Cloud Computing, 2011 IEEE International Conference on, pp. 740-741, Jul. 4-9, 2011, doi: 10.1109/CLOUD.2011.95.

Della Corte et al., "Collaborative Collection of Diagnostics Data of Software Programs," U.S. Appl. No. 14/638,040, filed Mar. 4, 2015.

IBM, "List of IBM Patents or Patent Applications Treated as Related," 2 pgs., Oct. 19, 2015.

COLLABORATIVE COLLECTION OF DIAGNOSTICS DATA OF SOFTWARE PROGRAMS

BACKGROUND

The present disclosure relates to the Information Technology (IT) field. More specifically, this disclosure relates to the diagnostics of software programs. The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Software programs may be subject to malfunctioning during their operation, especially when they run in a complex environment wherein multiple software programs interact among them. When this happens, diagnostics activities are commonly performed; the diagnostics activities may be aimed at identifying the cause of the malfunctioning, in order to try to fix it (by either repairing the malfunctioning permanently or simply bypassing it temporarily). For this purpose, diagnostics data (such as log files generated by tracing execution of the software programs) may be collected from the computing machines where the software programs run; the analysis of this diagnostics data provides useful hints about the context wherein the malfunctioning occurred (so as to facilitate the identification of its cause).

SUMMARY

Disclosed herein are embodiments of a method, computer program product, and computer system for performing diagnostics activities in a computing environment. The computing environment includes multiple software programs running on multiple endpoint computing machines. Each software program has associated diagnostics data. Each endpoint computing machine is running a diagnostics agent. The diagnostics agents are all in communication with one another.

A monitoring server interacts with the software programs and detects a malfunctioning of the interaction with one of the software programs running on a target endpoint computing machine. In response, the monitoring server submits a request to collect the diagnostics data of the malfunctioning software program. This collecting request is submitted to a service software program different from the malfunctioning software program. In some embodiments, the service software program is running on a service endpoint computing machine that is different from the target endpoint computing machine on which the malfunctioning software program was running.

The requested diagnostics data is retrieved by the service software program from a diagnostics agent running on the target endpoint computing machine. In some embodiments, a diagnostics agent running on the service endpoint computing machine submits a request to retrieve the diagnostics data of the malfunctioning software program. In such embodiments, this retrieving request is submitted to the diagnostics agent running on the target endpoint computing machine. The monitoring server then receives the requested diagnostics data from the service software program.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. For the sake of simplicity, corresponding elements are denoted with equal or similar references and their explanation is not repeated, and the name of each entity is generally used to denote both its type and its attributes—such as value, content and representation.

Figure 1:
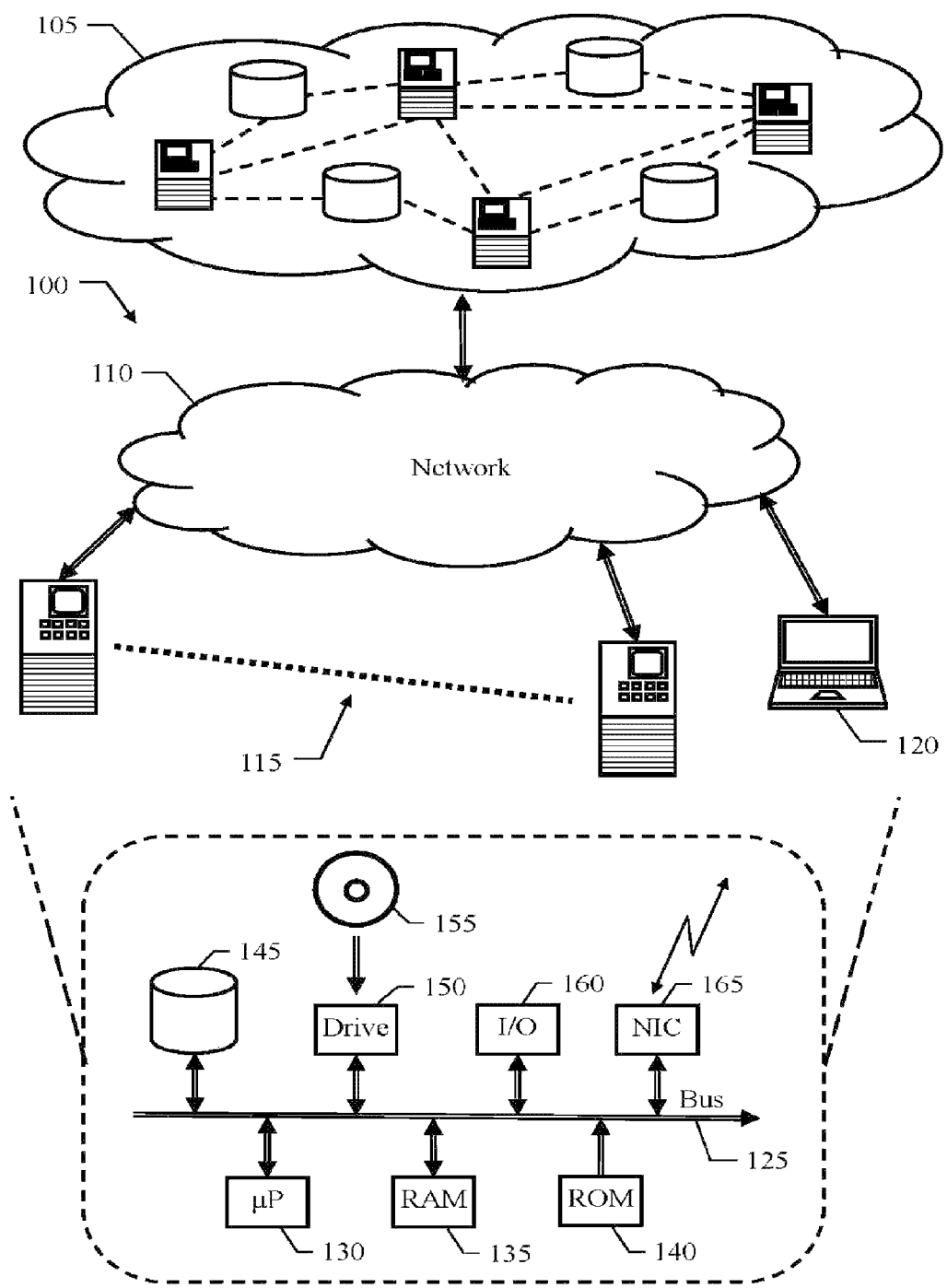
FIG. 1 is a block diagram illustrating an example computing environment for performing diagnostics activities, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The collection of diagnostics data can be relatively complex in specific environments. A typical example is in cloud computing (or simply cloud) environments, wherein cloud services are supplied on-demand by cloud providers that provision, configure and release them upon request (completely masking a corresponding implementation to corresponding users). In this case, as described in U.S. Patent Application Publication No. 2014/0109188 titled "Providing Remote Application Logs for Cloud Applications" and filed Oct. 16, 2012, incorporated herein by reference in its entirety, a cloud platform may provide a service that exposes an interface to remotely provide stored application logs of application components that are deployed on it; the exposed interface is instantiated to process remote requests for application logs for a specified application component that are sent from a client. Moreover, as described in U.S. Pat. No. 8,719,804 titled "Managing Runtime Execution of Applications on Cloud Computing Systems" and filed May 5, 2010, incorporated herein by reference in its entirety, a distributed, peer-to-peer (P2P) approach may be used to aggregate global system state, without the need for (or supplemental to) centralized monitoring, in order to build a scalable monitoring system; particularly, monitors deployed with each application instance may expose their state as attribute tuples that are propagated as updates in aggregation trees.

However, the collection of the diagnostics data may be quite difficult, if not impossible, in specific situations. A typical example is when the computing machines of the software programs are not directly accessible.

This generally happens in the cloud environments. For example, in the cloud environments software applications may be supplied as cloud services according to the Software-as-a-Service (SaaS) model. These software applications may interact with endpoint computing machines (or simply endpoints) of the users; a typical example is a (resource) monitoring application that is used to monitor selected resources of the endpoints. In this case, each software application has a central component running in the cloud environment that interacts with a local component running on each endpoint (i.e., a monitoring server that receives monitoring data of the endpoint from a corresponding monitoring agent in case of the monitoring application); however, in order to guarantee the privacy of any information of the users, the cloud provider may not access the endpoints in any other way (apart from communicating with the corresponding local components).

Therefore, whenever the malfunctioning of any local components of the software applications occurs, the cloud provider may not be able to collect any diagnostics data from the corresponding endpoints. In this case, the cloud provider has instead to request the users to provide the desired diagnostics data. For example, the users may access the endpoints where the local components are malfunctioning and upload their diagnostics data onto the cloud environment manually; however, this operation is time consuming and prone to errors. Moreover, the users may implement scripts that perform the same operations via FTP connections with the cloud provider; however, the FTP connections are relatively slow. In any case, the collection of the diagnostics data always requires an intervention of the users; this may be quite annoying and it may significantly increase the time required to fix any malfunctioning, thereby adversely affecting a corresponding quality of service (in terms of either customer satisfaction and performance of the software applications).

In general terms, the present disclosure is based on the idea of collecting the diagnostics data in a collaborative way. Particularly, an aspect provides a method for performing diagnostics activities in a computing environment, wherein diagnostics data of a malfunctioning software program is received from a service software program different therefrom, which service software program retrieves the diagnostics data of the malfunctioning software program from a target diagnostics agent running on a target computing machine of the malfunctioning software program. A further aspect provides a computer program for implementing the method (and a corresponding computer program product). A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

With reference in particular to FIG. 1, a schematic block-diagram is shown of a computing infrastructure 100 wherein the solution according to an embodiment of the present disclosure may be applied. Particularly, the computing infrastructure 100 is a cloud (computing) environment (supplying cloud resources on demand). The cloud environment 100 may be based on different deployment models, particularly, public cloud (i.e., for the general public), private cloud (i.e., for a single organization), community cloud (i.e., for several organizations) or hybrid cloud (i.e., based on a combination of different deployment models).

The cloud environment 100 comprises one or more cloud providers 105 (only one shown in the figure). Each cloud provider 105 is an entity that supplies a pool of (computing) resources as cloud services (i.e., shared resources that may be provisioned, configured and released very rapidly); the resources of the cloud services (generally of the virtual type, i.e., emulations by software of physical resources) are supplied upon request to users of the cloud provider 105, so that each user has the sole control of these resources (which may then be used exactly as if they were dedicated physical resources). The cloud services may be supplied according to several service models, particularly, Infrastructure as a Service, or IaaS (supplying computing and storage resources with corresponding management software, such as virtual machines, virtual disks), Platform as a Service, or PaaS (supplying software platforms, such as databases, web servers), Software As a Service, or SaaS (supplying software applications, such as monitors, office suites), and Network as a Service, or NaaS (supplying connectivity services, such as VPNs, IP addresses).

The users connect to the cloud provider 105 through a (communication) network 110. For this purpose, the cloud provider 105 exposes a front-end component for accessing it. Moreover, the cloud provider 105 has a back-end component that actually implements the supplied cloud resources, for example, a high number of server computing machines, or simply servers, organized in one or more server farms (not shown in the figure); the back-end component of the cloud provider 105 is not accessible from the outside, so that the users are completely agnostic about its location and configuration.

In the context of the present disclosure, the cloud resources offered by the cloud provider 105 comprise software applications supplied according to the SaaS models (wherein the cloud infrastructure 100 is public, with the cloud provider 105 that is a third party accessed through the Internet). For example, these software applications may comprise a (performance) monitoring application that is supplied as a service on-demand. In this case, the monitoring application may be exploited by a generic user of the cloud provider 105 to monitor selected (software and/or hardware) resources of one or more endpoint computing machines thereof, or simply endpoints, 115 (for example, servers of one or more data centers). The user accesses the monitoring application (for example, for configuring and reporting purposes) with one or more client computing machines thereof, or simply clients, 120 (for example, of the thin type).

Each computing machine of the cloud infrastructure 100 (i.e., server of the cloud provider 105, endpoint 115 and client 120 of the user) comprises several units that are connected in parallel to a bus structure 125 (with an architecture that is suitably scaled according to the actual function of the computing machine in the cloud infrastructure 100). In detail, one or more microprocessors (g) 130 control operation of the computing machine; a RAM 135 is used as a working memory by the microprocessors 130, and a ROM 140 stores basic code for a bootstrap of the computing machine. The computing machine is also provided with a mass-memory comprising one or more hard-disks 145 and drives 150 for reading/writing removable storage units 155 (for example, optical disks). Moreover, the computing machine has input/output (I/O) units 160 (for example, a keyboard, a mouse, and a monitor). A network adapter (NIC) 165 is used to connect the computing machine to the network 110. Particularly, in the case of the server of the cloud provider 105 the hard disks 145 may be provided by storage units of its server farm, and the drives 150 and the I/O units 160 may be provided by a console thereof.

Figure 2:
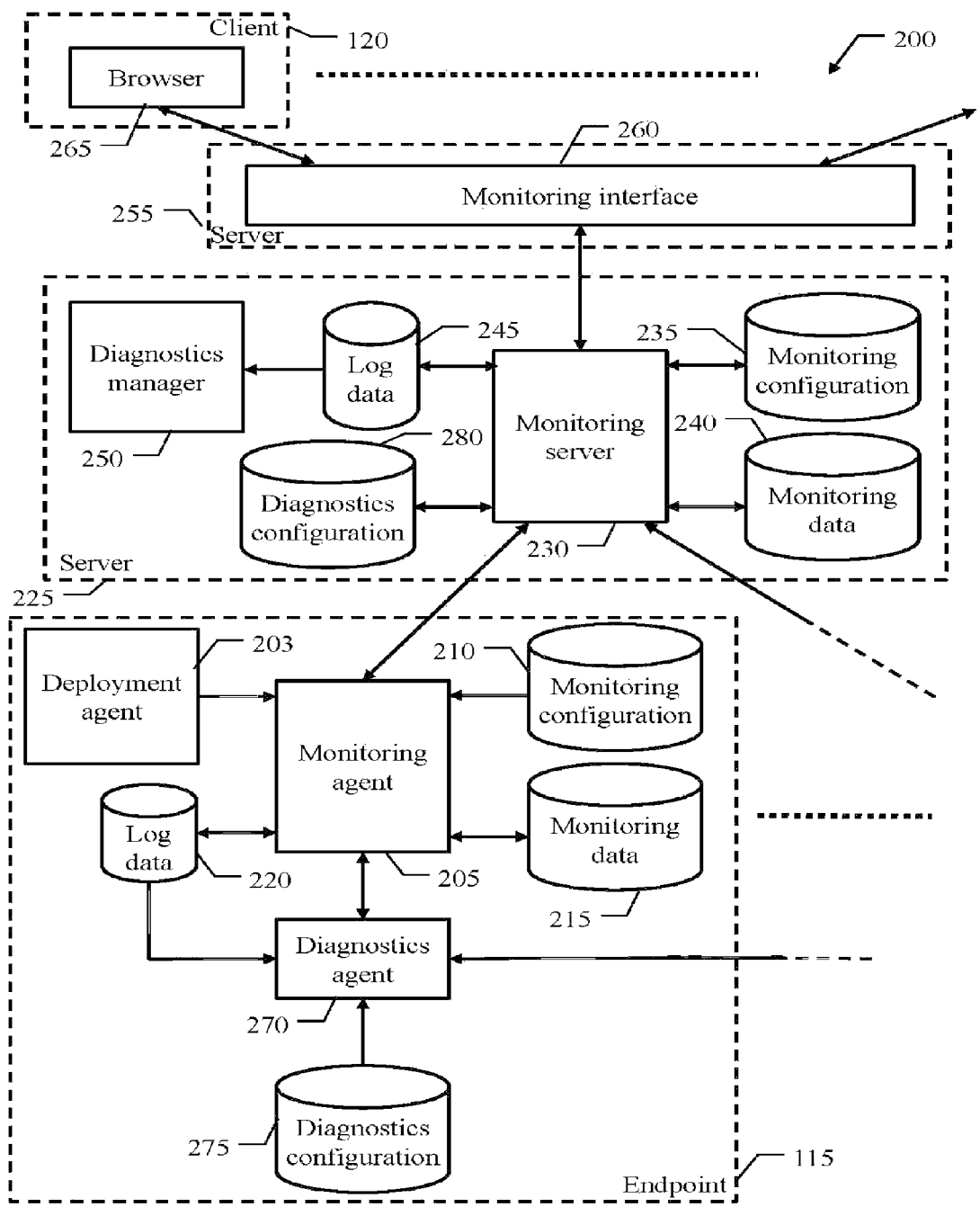
FIG. 2 is a block diagram illustrating example software components for use in performing diagnostics activities in a computing environment, according to embodiments of the present disclosure.

With reference now to FIG. 2, the main software components are shown that may be used to implement the solution according to an embodiment of the present disclosure.

All the software components (programs and data) are denoted as a whole with the reference 200. The software components 200 are typically stored in the mass memory and loaded (at least partially) into the working memory of the corresponding computing machines when the programs are running. The programs are initially installed into the mass memory, for example, from removable storage units or from the network. In this respect, each software component may represent a module, segment or portion of code, which comprises one or more executable instructions for implementing the specified logical function.

Particularly, each endpoint 115 of a generic user runs one or more (functional) software programs. For example, these software programs comprise a deployment agent 203 for deploying other software programs on the endpoint 115 (in cooperation with a deployment server, not shown in the figure, running on one or more servers of the cloud provider).

In the example at issue, the deployment agent 203 has deployed a monitoring agent 205 for monitoring selected (monitored) resources of the endpoint 115 (for example, processing power, working memory, operating system, application programs). For this purpose, the monitoring agent 205 accesses a (local) monitoring configuration repository 210, which stores a (monitoring) configuration of the monitoring agent 205 for controlling a corresponding monitoring activity (for example, metrics of the monitored resources to be measured, a frequency of their measurements). The monitoring agent 205 collects monitoring data, which is saved into a (local) monitoring data repository 215; the monitoring data comprises the values of the metrics of the monitored resources that are measured over time (for example, indicating consumption of hardware resources, such as their percentage, or usage of software resources, such as their processed transactions per seconds). The monitoring agent 205 is also instrumented to trace its execution, by saving log data relating thereto in succession into a (local) log data repository 220; the log data records an indication of selected events occurred during the execution of the monitoring agent 205 (for example, normal operations, warning conditions requiring actions to prevent errors, error conditions causing failures).

One or more servers of the cloud provider (only one shown in the figure, denoted with the reference 225) run a monitoring server 230 (being not accessible by the users), which implements the monitoring application supplied as a service (according to the SaaS model) to one or more corresponding users. For this purpose, the monitoring server 230 interacts with the monitoring agent 205 of the endpoints 115 of its users; however, the monitoring server 230 does not have direct access to the endpoints 115 (in order to guarantee the privacy of any information of the users available thereon). Moreover, the monitoring server 230 controls a (central) configuration repository 235 (which stores the monitoring configurations of the monitoring agents 205 of each user), a (central) monitoring data repository 240 (which stores the monitoring data of the monitoring agents 205 of each user) and a (central) log data repository 245 (which stores the log data of the monitoring agents 205 of each user). A diagnostics manager 250 is used (for example, by a system administrator of the cloud provider) to perform diagnostics activities on the monitoring agents 205 of all the users; for this purpose, the diagnostics manager 250 accesses the log data repository 245.

One or more servers of the cloud provider, either the same or different from the server 225 (only one shown in the figure, denoted with the reference 255) expose a monitoring interface 260, which communicates with the monitoring server 230. The client 120 of each user (only one shown in the figure) runs a browser 265 (which is normally used to surf the Internet); in this case, the browser 265 is also used to access the monitoring interface 260 to manage the monitoring of the endpoints 115 of the user (for example, to create, update, delete, start, stop monitoring activities thereon and to download corresponding monitoring reports).

In the solution according to an embodiment of the present disclosure, each endpoint 115 further runs a diagnostics agent 270 (for collecting the diagnostics data of other endpoints 115 of the same user, as described in the following). The diagnostics agent 270 of each endpoint 115 communicates with the corresponding monitoring agent 205, and with the diagnostics agents 270 of the other endpoints 115 of the same user (not shown in the figure). Moreover, the diagnostics agent 270 accesses a (local) diagnostics configuration repository 275, which stores a (diagnostics) configuration of the diagnostics agent 270 for controlling a sharing of the log data of the corresponding monitoring agent 205 (for example, a list of files or folders storing it). The diagnostics agent 270 accordingly accesses the log data repository 220 (i.e., its files/folders indicated in the diagnostics configuration). In this case, the monitoring server 230 further controls a (central) diagnostics configuration repository 280 (storing the diagnostics configurations of the diagnostics agents 270 of each user, which may be managed by the user as above with his/her browser 265 through the monitoring interface 260).

With reference now to FIG. 3A-FIG. 3D, an exemplary application is shown of the solution according to an embodiment of the present disclosure.

Figure 3A:
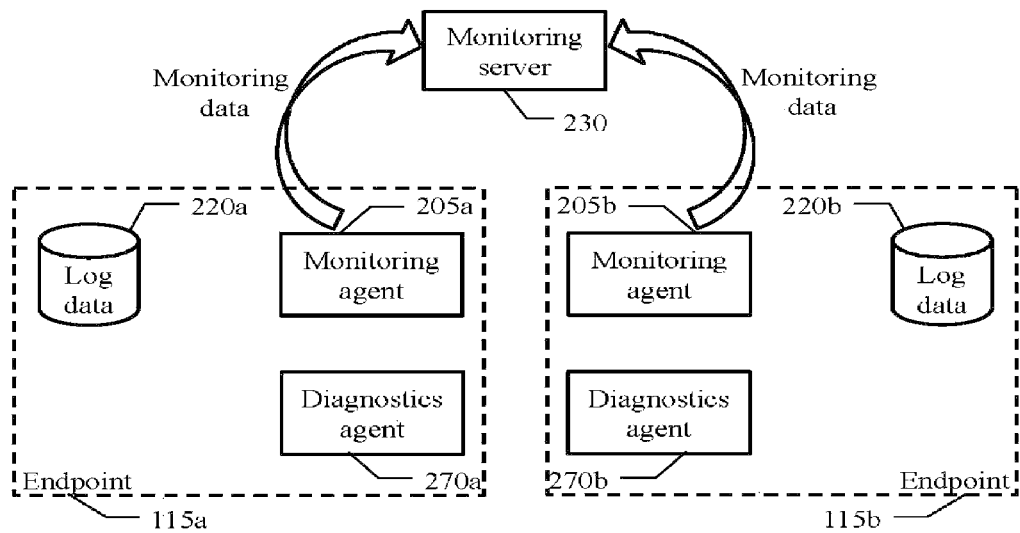
FIG. 3A is a block diagram illustrating example interactions between a monitoring server and software programs running on endpoint computing machines, according to embodiments of the present disclosure.

Starting from FIG. 3A, during a normal operation of the monitoring application, the monitoring server 230 interacts with the monitoring agents of all the endpoints; particularly, the monitoring server 230 continually receives the monitoring data collected on each endpoint from the corresponding monitoring agent. For example, the figure shows two endpoints, which endpoints and the corresponding software components are differentiated with the addition of the suffixes "a" and "b" to their references; therefore, in this case the monitoring server 230 receives the monitoring data of the endpoint 115a from its monitoring agent 205a and the monitoring data of the endpoint 115b from its monitoring agent 205b.

Figure 3B:
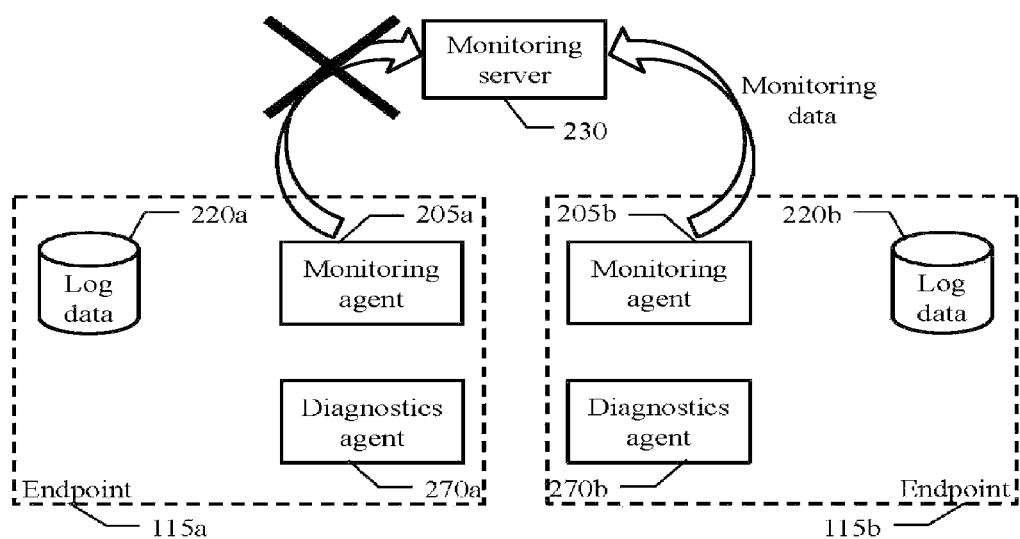
FIG. 3B is a block diagram illustrating an example malfunctioning of the interaction between a monitoring server and a software program running on and endpoint computing machine, according to embodiments of the present disclosure.

Moving to FIG. 3B, a malfunctioning of the interaction with a (malfunctioning) monitoring agent occurs, such as the monitoring agent 205a. For example, this may happen when the monitoring agent 205a crashes (with its malfunctioning that is detected when the monitoring server 230 does not receive the corresponding monitoring data any longer); nevertheless, the corresponding endpoint 115a (with its diagnostics agent 207a) is still running.

Figure 3C:
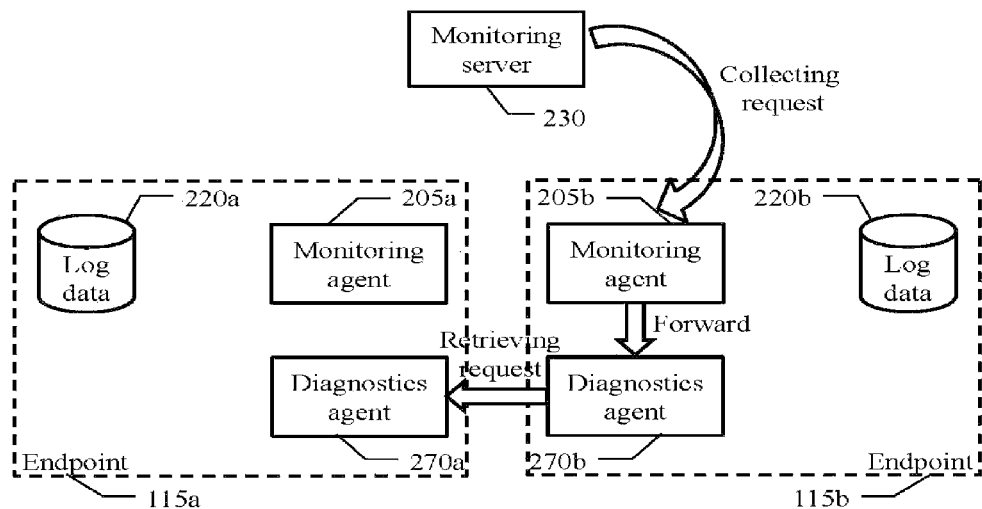
FIG. 3C is a block diagram illustrating an example submission of a request to collect the diagnostics data of a malfunctioning software program from a monitoring server to a service software program, according to embodiments of the present disclosure.

In this case, as shown in FIG. 3C, in the solution according to an embodiment of the present disclosure the monitoring server 230 submits a collecting request for the log data of the monitoring agent 205a to a different (service) monitoring agent (i.e., the monitoring agent 205b in the example at issue). The monitoring agent 205b forwards the collecting request to its (service) diagnostics agent 270b. In turn, the diagnostics agent 270b submits a retrieving request for the log data of the monitoring agent 205a to its (target) diagnostics agent 270a.

Figure 3D:
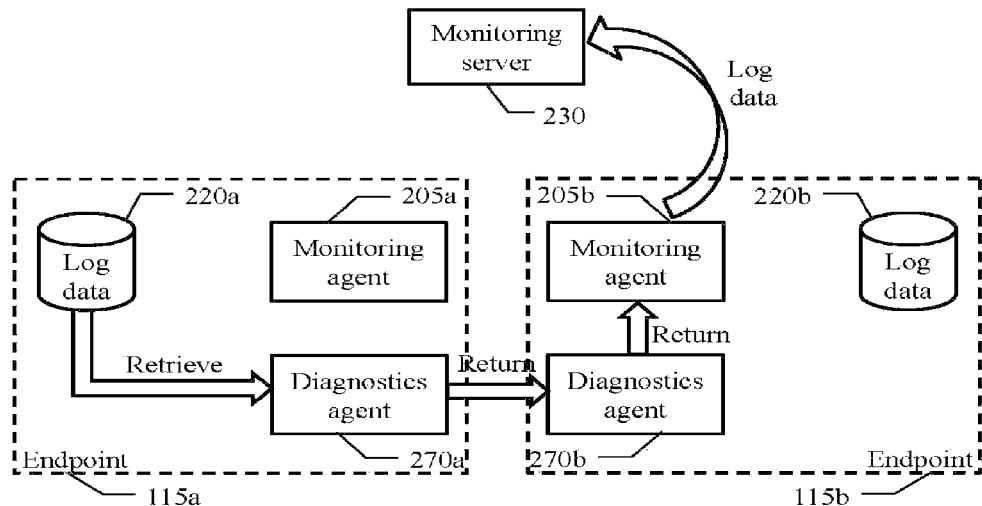
FIG. 3D is a block diagram illustrating an example reception of the diagnostics data of a malfunctioning software program by a monitoring server from a service software program, according to embodiments of the present disclosure.

Moving to FIG. 3D, in response thereto the diagnostics agent 270a retrieves the log data of the monitoring agent 205a (from the log data repository 220a). The diagnostics agent 270a then returns the log data of the monitoring agent 205a to the diagnostics agent 270b. The diagnostics agent 270b returns the log data of the monitoring agent 205a to the monitoring agent 205b. In turn, the monitoring agent 205b returns the log data of the monitoring agent 205a to the monitoring server 230.

The above-described solution implements an ad-hoc collaborative (peer-to-peer) infrastructure among the diagnostics agents 270a, 270b for collecting the log data of their monitoring agents 205a, 205b (or more generally any other diagnostics data of any other software programs).

In this way, the log data of the (malfunctioning) monitoring agent 205a may be collected even when its endpoint 115a is not accessible directly. This result may also be achieved without requiring any intervention by the user of the endpoint 115a; this avoids annoying the user and it significantly reduces the time required to fix any malfunctioning, with a beneficial effect on a corresponding quality of service (in terms of either customer satisfaction and performance of the monitoring application).

Moreover, the collection of the log data by the monitoring server 230 is still implemented by exploiting the (standard) communications with the monitoring agents 205a, 205b (in this case, with the monitoring agent 205b for collecting the diagnostics data of the monitoring agent 205a); therefore, the communications may be quite effective. In any case, the sharing of the log data among the diagnostics agents 270a, 270b does not pose any privacy exposure, since it may be controlled at will by the users (for example, only among their endpoints 115a, 115b).

Figure 4A:
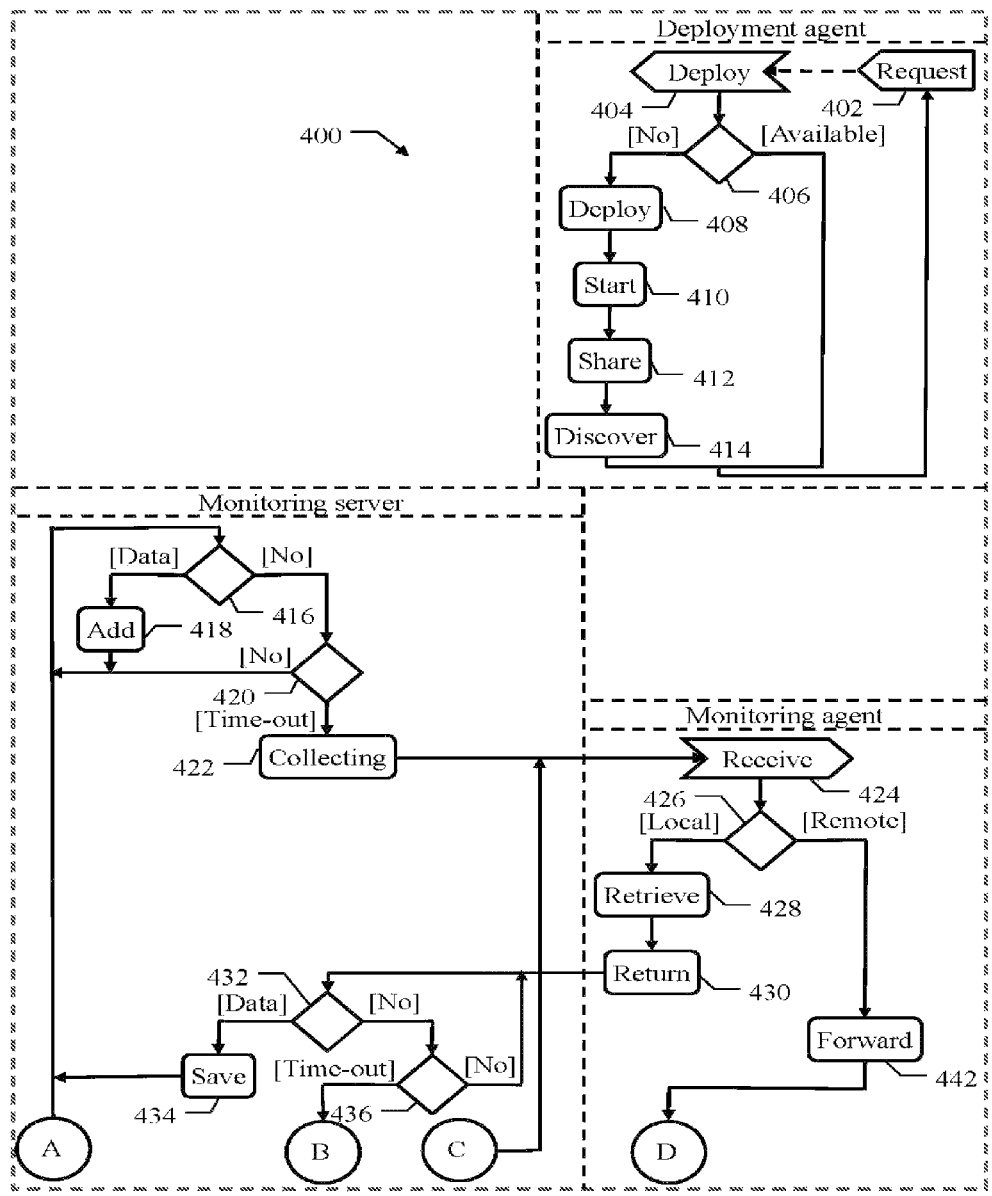
FIG. 4A is the first part of an activity diagram illustrating example diagnostics activities performed by a monitoring server, monitoring agents, and diagnostics agents in a computing environment, according to embodiments of the present disclosure.
Figure 4B:
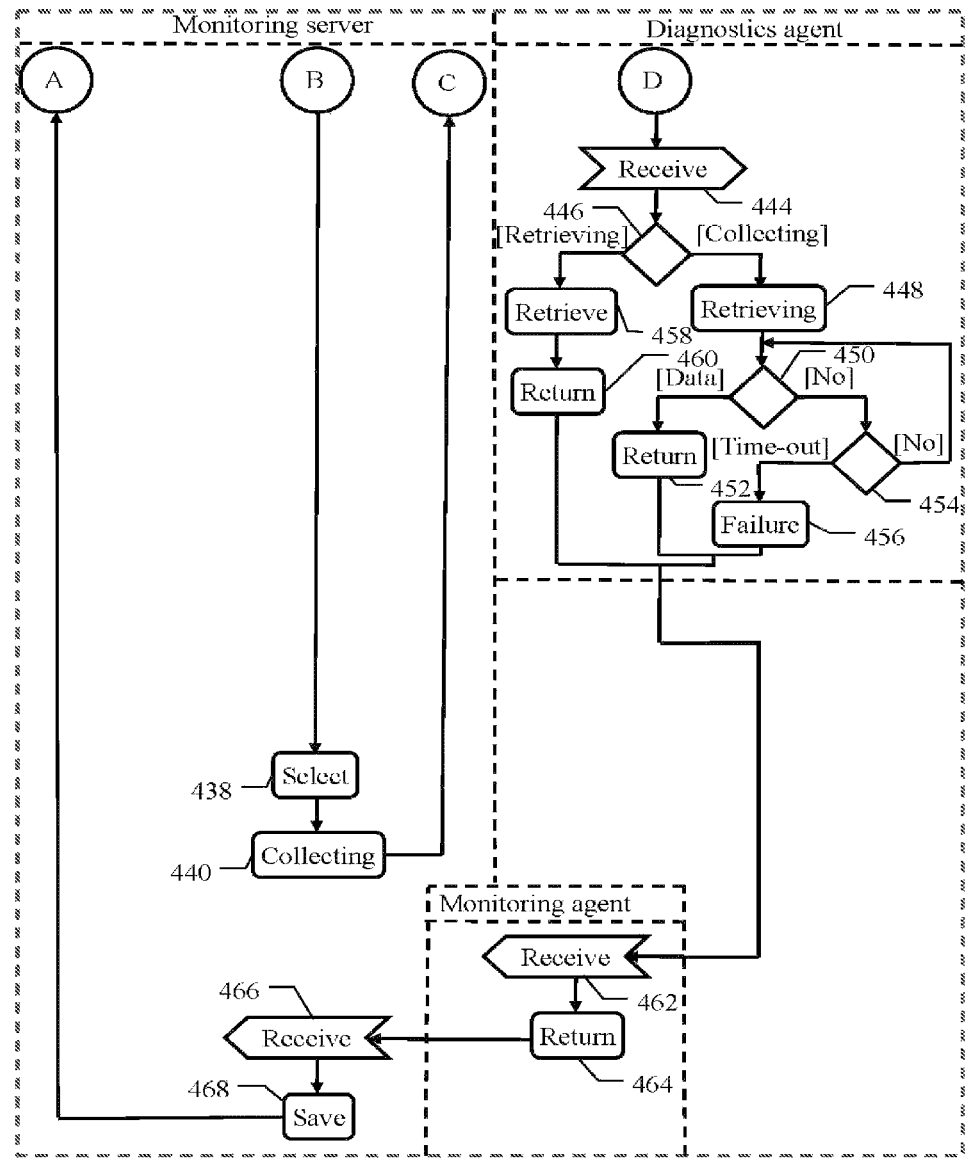
FIG. 4B is the second part of an activity diagram illustrating example diagnostics activities performed by a monitoring server, monitoring agents, and diagnostics agents in a computing environment, according to embodiments of the present disclosure.

With reference now to FIG. 4A-FIG. 4B, an activity diagram is shown describing the flow of activities relating to an implementation of the solution according to an embodiment of the present disclosure.

Particularly, the diagram represents an exemplary process for performing diagnostics activities on the above-described endpoints with a method 400. In this respect, each block may represent one or more executable instructions for implementing the specified logical function on the relevant computing machine.

Starting from the swim-lane of the deployment agent of a generic endpoint, it is listening at block 402 for any deployment request from the deployment server (not shown in the figure). As far as relevant to the present disclosure, the process passes to block 404 when a deployment request has been received for deploying a new software program (or any update thereof) onto the endpoint (i.e., the monitoring agent in the example at issue). In response thereto, the monitoring agent is deployed by downloading a corresponding software package (for example, from a deployment depot not shown in the figure) and then applying it onto the endpoint, so as to install and configure the monitoring agent accordingly.

A test is now made at block 406 to verify whether the diagnostics agent is already available on the endpoint. If not (meaning that this is the first software program associated thereto that is deployed on the endpoint) the diagnostics agent as well is deployed onto the endpoint at block 408 (being either comprised in the same software package of the monitoring agent or provided with a dedicated software package). Continuing to block 410, the diagnostics agent is started in a dedicated process; in this way, the diagnostics agent remains running irrespectively of any malfunctioning of the other software programs of the endpoint (unless the malfunctioning impairs operation of the whole endpoint). The diagnostics agent at block 412 reads its diagnostics configuration (for example, in one or more XML files), in order to determine the diagnostics data of the software programs running on the endpoint that may be shared with the other endpoints of the user (i.e., the log data of the monitoring agent in the example at issue); the same operation is also performed in response to any change of the diagnostics configuration (not shown in the figure). With reference now to block 414, the diagnostics agent discovers the diagnostics agents that are available on the other endpoints of the user (for example, by broadcasting a corresponding request in an Intranet thereof and listening for any corresponding response, with the same request that is also used by the other diagnostics agents to become aware if its availability). The process then returns to the block 402 waiting for a next deployment request; the same point is also reached directly from the block 406 when the diagnostics agent is already available on the endpoint.

In a completely independent way, the monitoring server is listening in its swim-lane for any communication from the monitoring agents of all its users. For this purpose (as far as relevant to the present disclosure), a loop is performed continuously by verifying at block 416 whether monitoring data has been received from any monitoring agent. If so, the monitoring server adds the monitoring data to a corresponding entry of its monitoring data repository at block 418. The process then returns to the block 416 to reiterate the same operations described above. Conversely, if no monitoring data has been received, a further test is made at block 420 to verify whether a (monitoring) time-out of any monitoring agents (for example, equal to 1.5-3 times a period of their measurements) has expired. If not, in this case as well the process returns to the block 416 waiting again for the monitoring data. Conversely, when the time-out of a monitoring agent has expired (meaning that a malfunctioning may have occurred since the monitoring server does not receive its monitoring data any longer), a collecting request for the log data of this monitoring agent is submitted at block 422.

Moving to the swim-lane of the monitoring agent of a generic endpoint, it is listening at block 424 for any communication from the monitoring server. As far as relevant to the present disclosure, the process passes to block 426 when a collecting request has been received; at this point, the flow of activity branches according to the type of collecting request. Particularly, when the collecting request is local since relating to the log data of the monitoring agent itself (as received from the monitoring server at the block 422) the required log data is retrieved at block 428. This log data is returned to the monitoring server at block 430 (with the flow of activity in the swim-lane of the monitoring agent that returns to the block 424 to reiterate the same operations described above, not shown in the figure for the sake of simplicity).

Referring back to the swim-lane of the monitoring server, it is listening for the log data that has been requested to the monitoring agent at the block 422. For this purpose, a loop is performed continuously by verifying at block 432 whether this log data has been received. If so, the monitoring server saves the log data into its log data repository at block 434 (for example, for its analysis by the system administrator accordingly warned). The process then returns to the block 416 to reiterate the same operations described above. Conversely, if the log data has not been received yet, a further test is made at block 436 to verify whether a corresponding (diagnostics) time-out (for example, equal to 1-2 s) has expired. If not, the process returns to the block 432 waiting again for the log data. Conversely, when the time-out has expired without receiving the log data, the flow of activity descends into block 438. In this case, it is likely that a malfunctioning of the monitoring agent has occurred (for example, it has crashed); therefore, a different (service) monitoring agent is selected for this (malfunctioning) monitoring agent. For example, the service monitoring agent is the monitoring agent that is closest to the malfunctioning monitoring agent (among all the other monitoring agents being not malfunctioning) according to one or more corresponding metrics (such as defined according to a quality of a network connection between their endpoints). A collecting request for the log data of the malfunctioning monitoring agent is then submitted at block 440 to the service monitoring agent.

The monitoring agent of a generic endpoint receives this collecting request as above at the block 424, passing then to the block 426. In this case, the collecting request is remote since not relating to the log data of the (service) monitoring agent itself; therefore, the flow of activity descends into block 442 wherein the collecting request is forwarded to the corresponding (service) diagnostics agent, with the flow of activity in the swim-lane of the service monitoring agent that returns to the block 424 waiting for a next communication from the monitoring server, not shown in the figure for the sake of simplicity.

Moving to the swim-lane of the diagnostics agent of a generic endpoint, it is listening at block 444 for any request from its monitoring agent or from the other diagnostics agents. The process passes to block 446 as soon as a request has been received; at this point, the flow of activity branches according to the type of the request. Particularly, when the (service) diagnostics agent has received a collecting request for the log data of the malfunctioning monitoring agent (from its service monitoring agent at the block 442), a corresponding retrieving request for the log data of the malfunctioning monitoring agent is submitted at block 448 to the corresponding (target) diagnostics agent.

The service diagnostics agent then starts listening for the log data of the malfunctioning monitoring agent. For this purpose, a loop is performed continuously by verifying at block 450 whether this log data has been received. If so, the service diagnostics agent returns the log data to its service monitoring agent at block 452. Conversely, if the log data has not been received yet, a further test is made at block 454 to verify whether a corresponding (retrieval) time-out (for example, equal to 1-2 s) has expired. If not, the process returns to the block 450 waiting again for the log data. Conversely, when the time-out has expired without receiving the log data, the flow of activity descends into block 456. In this case, the log data of the malfunctioning monitoring agent is set to an indication of a missing response from its target diagnostics agent, meaning that a failure of the corresponding (target) endpoint (for example, a global malfunctioning or a complete stop) is likely to have occurred; the service diagnostics agent then returns this log data to its service monitoring agent as above. Returning to the block 446, when the (target) diagnostics agent has received a retrieval request of its (malfunctioning) monitoring agent from another (service) diagnostics agent (at the block 448 as above), the process descends into block 458; at this point, the target diagnostics agent retrieves the log data of its malfunctioning monitoring agent. Continuing to block 460, the target diagnostics agent returns this log data to the service diagnostics agent (for its receipt at the block 450 as above). In any case, the flow of activity in the swim-lane of the diagnostics agent returns from the block 452, from the block 456 or from the block 460 to the block 444 to reiterate the same operations described above, not shown in the figure for the sake of simplicity.

Referring back to the swim-lane of the (service) monitoring agent, it is listening at block 462 for the log data of the malfunctioning monitoring agent that has been requested at the block 442. As soon as this log data has been received, it is returned to the monitoring server at block 464 (with the flow of activity in the swim-lane of the service monitoring agent that returns to the block 424 to reiterate the same operations described above, not shown in the figure for the sake of simplicity).

Returning to the swim-lane of the monitoring server, it is listening at block 466 for the log data of the malfunctioning monitoring agent that has been requested to the service monitoring agent at the block 440. As soon as this log data has been received, the monitoring server saves it into its log data repository at block 468. The process then returns to the block 416 to reiterate the same operations described above.

Modifications

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for performing diagnostics activities in a computing environment. The method comprises interacting with a plurality of software programs running on one or more endpoint computing machines. The method further comprises the following steps in response to a malfunctioning of the interacting with a malfunctioning software program of the software programs running on a target computing machine of the endpoint computing machines. A collecting request for diagnostics data of the malfunctioning software program is submitted to a service software program of the software programs different from the malfunctioning software program, in order to cause the service software program to retrieve the diagnostics data of the malfunctioning software program from a target diagnostics agent running on the target computing machine. The diagnostics data of the malfunctioning software program is received from the service software program.

However, the diagnostics activities to be performed may be of any type (for example, for debugging the software programs during their development, for restoring the correct operation of the software programs in a production environment, either in real-time or in bulk) and they may be applied to any computing environment (see below). The endpoint computing machines may be in any number and of any type, each one running any number and type of software programs (see below); the interaction with the software programs may be of any type (for example, based on requests and corresponding responses). The malfunctioning may be of any type (see below), the collecting request may be submitted in any way (for example, even directly without any previous attempt to collect the diagnostics data from the software program itself); moreover, the diagnostics data may be received in any way (see below) and it may be of any type (for example, system dumps).

In an embodiment, said step of submitting a collecting request comprises submitting the collecting request to the service software program running on a service computing machine of the endpoint computing machines different from the target computing machine.

However, the possibility of submitting the collecting request to the service software program running on the same target computing machine of the malfunctioning software program is not excluded.

In an embodiment, a diagnostics agent runs on each endpoint computing machine. Said step of submitting a collecting request comprises submitting the collecting request to the service software program, in order to cause the service software program to retrieve the diagnostics data of the malfunctioning software program from the diagnostics agent of the target computing machine (operating as the target diagnostics agent) through the diagnostics agent of the service computing machine (operating as a service diagnostics agent).

However, the diagnostics agent any be of any type (for example, running in a dedicated thread). In any case, the possibility for the service software program to submit the collecting request to the target diagnostics agent directly is not excluded.

In an embodiment, the method comprises the following steps on the service computing machine. The collecting request is received from a remote application by the service software program. The collecting request is forwarded to the service diagnostics agent by the service software program. A retrieving request for the diagnostics data of the malfunctioning software program is submitted to the target diagnostics agent by the service diagnostics agent. The diagnostics data of the malfunctioning software program is received from the target diagnostics agent by the service diagnostics agent. The diagnostics data of the malfunctioning software program is returned to the service software program by the service diagnostics agent. The diagnostics data of the malfunctioning software program is returned to the remote application by the service software program.

However, the collecting request may be received from any remote application (see below) and it may be provided to the service diagnostics agent in any way, for example, with the service diagnostics agent that directly intercepts it (such as by hooking techniques or by wrapping the service software program); moreover, the retrieving request may be of any type (for example, a simple forward of the collecting request).

In an embodiment, the method comprises the following steps on the target computing machine. The retrieving request is received from the service diagnostics agent by the target diagnostics agent. The diagnostics data of the malfunctioning software program is retrieved by the target diagnostics agent. The diagnostics data of the malfunctioning software program is returned to the service diagnostics agent by the target diagnostics agent.

However, the diagnostics data may be provided to the service software program in any way (for example, by simply enabling its access remotely).

In an embodiment, the method further comprises the following steps on each endpoint computing machine. A new software program of the software programs is deployed onto the endpoint computing machine. A new diagnostics agent of the diagnostics agents is deployed onto the endpoint computing machine in association with the deployment of the new software program in response to none of the software programs being already available on the endpoint computing machine.

However, the diagnostics agent may be deployed in any way, even independently of the deployment of the software programs (for example, by installing it directly when the endpoint computing machine is shipped).

In an embodiment, the method further comprises the following steps on each endpoint computing machine. One or more memory structures (storing the diagnostics data of each software program running on the endpoint computing machine) are shared by the diagnostics agent of the endpoint computing machine with the diagnostics agent of each other endpoint computing machine according to corresponding configuration information.

However, the memory structures may be in any number (for example, dedicated to each software program or common to all/part of them) and of any type (for example, in the Common Log Format); moreover, the configuration information may be of any type (for example, in the JASON format). In any case, a basic implementation wherein an indication of the diagnostics data to be shared is hardcoded in the diagnostics agent is not excluded.

In an embodiment, the method further comprises the following step on each endpoint computing machine. The diagnostics agent of each other endpoint computing machine is discovered by the diagnostics agent of the endpoint computing machine.

However, the diagnostics agents of the other endpoint computing machines may be discovered in any way and at any time (for example, periodically by a spider); in any case, the definition of the whole computing environment with all its diagnostics agents may be maintained centrally and downloaded onto the endpoint computing machines without the need of performing any discovering activity locally.

In an embodiment, said step of submitting a collecting request comprises selecting the service software program among the software programs different from the malfunctioning software program according to one or more selection criteria.

However, the selection criteria may be in any number and of any type (for example, based on a workload of the endpoint computing machines); in any case, a simple random selection of the service software program is not excluded.

In an embodiment, said step of interacting with a plurality of software programs comprises receiving operative data from each software program continually; the method further comprises the step of detecting the malfunctioning of the interacting with the malfunctioning software program in response to a missing receiving of the operative data therefrom.

However, the operative data may be of any type (down to a simple heartbeat signal) and it may be provided with any timing (for example, by signaling every critical condition as soon as it occurs); moreover, the missing receipt of the operative data may be detected in any way (for example, only after two or more consecutive loss thereof). In any case, different, additional or alternative techniques may be used to determine any type of malfunction of the software programs (for example, when a request does not receive a corresponding response within a maximum time).

In an embodiment, each software program is a monitoring agent of a monitoring application; said step of receiving operative data comprises receiving monitoring data of the corresponding endpoint computing machine from each monitoring agent by a monitoring server of the monitoring application.

However, the software programs may be of different, additional or alternative type (for example, load-balancing agents, deployment agents), with similar considerations that apply to the corresponding operative data (for example, workload data, deployment results).

In an embodiment, said step of submitting a collecting request and said step of receiving the diagnostics data are performed by a remote entity having no access to the endpoint computing machines apart from interacting with the corresponding software programs.

However, the same steps may be performed by any remote entity (for example, the diagnostics manager). In any case, nothing prohibits using the same techniques described above in any other scenario (even when some sort of access to the endpoint computing machines is available, for example, for tracking their resource usage).

In an embodiment, said step of interacting with a plurality of software programs comprises interacting with the software programs by a software application provided as a service in a cloud computing environment.

However, the cloud computing environment may be of any type (for example, hybrid) and the software application may be provided in any way (for example, according to the PaaS model). In any case, the same technique may also be applied to any other computing environment (for example, of the client-server type).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Portions of one or more embodiments of the invention may be implemented in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

A further embodiment provides a system comprising means configured for performing the steps of the same method. However, the method may be performed on any system. The system may be based on a different architecture (for example, a local, wide area, global, cellular or satellite network), and it may exploit any type of (wired and/or wireless) connections. However, the implementation of the method on a stand-alone computer (for example, for performing diagnostics activities on virtual machines hosted thereon) is not excluded. In any case, each computing machine used to implement the method may have another structure or may comprise similar elements; moreover, it is possible to replace the computing machine with any code execution entity, based on either a physical machine or a virtual machine or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for performing diagnostics activities in a computing environment, the computing environment including a plurality of software programs running on a plurality of endpoint computing machines, the method comprising:
   interacting with the plurality of software programs, each of the plurality of software programs associated with diagnostics data, each of the plurality of endpoint computing machines running a diagnostics agent of a plurality of diagnostics agents, the plurality of diagnostics agents in communication with each other;
   detecting a malfunctioning interaction with a malfunctioning software program of the plurality of software programs, the malfunctioning software program running on a target endpoint computing machine of the plurality of endpoint computing machines;
   submitting, in response to the detecting the malfunctioning interaction, a collecting request for the diagnostics data of the malfunctioning software program to a service software program of the plurality of software programs, the service software program different from the malfunctioning software program; and
   receiving the diagnostics data of the malfunctioning software program from the service software program, the diagnostics data retrieved by the service software program from a target diagnostics agent of the plurality of diagnostics agents running on the target endpoint computing machine.

2. The method of claim 1, wherein the service software program is running on a service endpoint computing machine of the plurality of endpoint computing machines, the service endpoint computing machine being different from the target endpoint computing machine.

3. The method of claim 2, wherein the diagnostics data is retrieved by the service software program through a service diagnostics agent of the plurality of diagnostics agents, the service diagnostics agent running on the service endpoint computing machine.

4. The method of claim 3, further comprising:
   forwarding, by the service software program to the service diagnostics agent, the collecting request;
   submitting, by the service diagnostics agent to the target diagnostics agent, a retrieving request for the diagnostics data;
   receiving, by the service diagnostics agent from the target diagnostics agent, the diagnostics data; and
   returning, by the service diagnostics agent to the service software program, the diagnostics data.

5. The method of claim 3, further comprising:
   retrieving the diagnostics data by the target diagnostics agent; and
   returning, by the target diagnostics agent to the service diagnostics agent, the diagnostics data.

6. The method of claim 1, further comprising:
   deploying a new software program onto a new endpoint computing machine;

determining that none of the plurality of software programs are deployed on the new endpoint computing machine;

deploying a new diagnostics agent onto the new endpoint computing machine; and establishing, by the new diagnostics agent, communication with the plurality of diagnostics agents.

7. The method of claim 6, further comprising:

sharing, by the new diagnostics agent with the plurality of diagnostics agents, one or more memory structures storing the diagnostics data of the new software program, the sharing according to configuration information associated with the new software program.

8. The method of claim 6, wherein the establishing the communication with the plurality of diagnostics agents comprises discovering the diagnostics agent of each of the plurality of diagnostics agents.

9. The method of claim 1, further comprising:

selecting, before the submitting the collecting request, the service software program according to one or more selection criteria.

10. The method of claim 1, wherein the interacting with the plurality of software programs comprises receiving operative data from each software program periodically, the method further comprising:

missing a receiving of the operative data from the malfunctioning software program.

11. The method of claim 10, wherein each of the plurality of software programs is a monitoring agent of a monitoring application, and wherein the receiving the operative data comprises receiving monitoring data of the corresponding endpoint computing machine from each monitoring agent by a monitoring server of the monitoring application.

12. The method of claim 1, wherein the submitting the collecting request and the receiving the diagnostics data are performed by a remote entity having no access to the plurality of endpoint computing machines apart from interacting with the plurality of software programs.

13. The method of claim 1, wherein the interacting with the plurality of software programs comprises accessing a software application provided as a service in a cloud computing environment.

* * * * *